United States Patent [19]
Kaihara et al.

[11] Patent Number: 5,329,456
[45] Date of Patent: Jul. 12, 1994

[54] MATERIAL FLOW CONTROL DEVICE

[75] Inventors: Toshiya Kaihara; Satoshi Kawashima; Hiroshi Imai; Kiyoshi Ide; Fumiaki Suzuki, all of Amagasaki; Takao Shimizu, Itami, all of Japan

[73] Assignee: Mitsubishi Denki Kabushiki Kaisha, Tokyo, Japan

[21] Appl. No.: 925,740

[22] Filed: Aug. 7, 1992

[30] Foreign Application Priority Data

Aug. 9, 1991 [JP] Japan ................. 3-200561
Mar. 13, 1992 [JP] Japan ................. 4-055284

[51] Int. Cl.⁵ ............................. G06F 15/46
[52] U.S. Cl. ......................... 364/468; 364/478
[58] Field of Search ............. 364/468, 478, 401–403

[56] References Cited

U.S. PATENT DOCUMENTS

| 4,852,001 | 7/1989 | Tsushima et al. | 364/468 X |
| 4,896,269 | 1/1990 | Tong | 364/468 |
| 5,214,588 | 5/1993 | Kaneko et al. | 364/468 |

OTHER PUBLICATIONS

T. Mitamura et al., "Material Handling System for Clean Environment", Japan-U.S.A. Symposium on Flexible Automation, 1986, pp. 511–515.

R. Uehara et al., "FA System in Semiconductor Factory", *Technical Journal of Mitsubishi Denki Corporation*, vol. 61, No. 4, (1987), pp. 41–44.

*Primary Examiner*—Joseph Ruggiero
*Attorney, Agent, or Firm*—Burns, Doane, Swecker & Mathis

[57] ABSTRACT

A material flow control device for controlling flows of a plurality of work species within a production system measures the two-stage engagement amounts and the output amounts of respective work species in respective controlled units, and calculates the evaluation values for respective work species in the respective controlled units as a function of: the difference (or the ratio) of the measured engagement amount and a reference engagement amount; and the difference (or the ratio) of the measured output amount and the reference output amount. The order of dispensation from the upstream controlled units are determined in accordance with the priority determined by the evaluation values for the respective work species.

5 Claims, 8 Drawing Sheets

MATERIAL FLOW CONTROL DEVICE

BACKGROUND OF THE INVENTION

This invention relates to material flow control devices for production system for producing plural species of works or articles, by which the operation rates of the production devices within the production system are stabilized and are not susceptible to disturbing factors such as the occurrence of a failure of the production devices.

FIG. 8 is a block diagram showing the functional structure of a conventional material flow control device. The material flow control device controls a plurality of controlled production units of a production system as shown in FIG. 10, using a waiting queue file shown in FIG. 9.

The amounts of works (the parts or articles which are produced in the production system) engaged in respective controlled units within the production system are measured by an engagement amount measuring unit 101. The processing order determination unit 102 determines the order of the processing of the works on the basis of the first-in first-out (FIFO) principle as described below. The status of the production system is input via a production system status input unit 103 to trigger the material flow control, and the processing instructions are output from a processing instruction output unit 104 to the respective controlled units within the production system.

FIG. 10 is a block diagram showing the simplified structural model of the conventional production system. The production system includes a plurality of controlled production equipment units 601 through 603. The order of the processing is determined by a material flow control device 604 whose structure is shown in FIG. 8. The controlled unit 603, for example, includes a plurality of production device groups 605 and 606.

FIG. 9 is a diagram showing a processing wait queue for a production unit 603 within the production system of FIG. 10 controlled by the material flow control device of FIG. 8. The waiting queue file or processing wait accumulation file 800 is generated within the processing order determination unit 102. A plurality of processing waiting request items 801 through 805 are accumulated in a waiting queue file 800. The leading numerals within the elongated circles represent respective sources of the processing requests, and the numerals after the hyphen represent the generation order of the requests. The numbers at the right of respective encircled items represent the order of processing of the works in the controlled unit 603. Thus, the requests with the leading number 601 within the circle represent works which are to be transferred from the controlled unit 601 to the controlled unit 603. On the other hand, the requests with the leading number 602 represent works which are to be transferred from controlled unit 602 to controlled unit 603. As shown in the figure, the order of processing is determined by the simple first-in first-out (FIFO) principle, without regard to the source unit or the destination device group of the requests.

Next, the operation of the conventional material flow control device is described. It is assumed that the works are transferred from the material flow control units 601 and 602 to the controlled unit 603. Then, the requests for processing the works originating from the controlled unit 601 and those originating from the controlled unit 602 are detected by the engagement amount measuring unit 101, and are accumulated in the waiting queue file 800 within the processing order determination unit 102.

When the controlled unit 603 is ready for accepting further works, it outputs its ready status to the production system status input unit 103. Upon receiving this status signal from the controlled unit 603, the production system status input unit 103 supplies a flow control trigger signal to the processing order determination unit 102. In response thereto, the processing order determination unit 102 outputs via the processing instruction output unit 104 the processing instruction for the bottom request item (the oldest request) in the waiting queue file 800. The processing instruction is output to the controlled unit 601 or controlled unit 602 in accordance with the indication of the source in the processed item in the waiting queue file 800. As a result, the works either in the controlled unit 601 or the controlled unit 602 are dispensed and transferred to the device group 605 or the device group 606 within the controlled unit 603. The processing order is determined simply by the first-in first-out (FIFO) principle, without regard to the source (controlled unit 601 or controlled unit 602) or the destination (device group 605 or device group 606) of the request.

Thus, the above conventional material flow control device has the following disadvantage. Assume that the device group 605 within the controlled unit 603 is occupied in processing the works while the device group 606 is in an idle state (not occupied). Further assume that the oldest processing request within the waiting queue file 800 is destined for the device group 605. Then, the works are first dispensed from the controlled unit 601 and transferred to the device group 605 in spite of the fact that the device group 605 is busy and the device group 606 is idle. As a result, the device group 606 remains idle and the working rate thereof is reduced.

Further, assume that the device group 605 undergoes a failure, and that the older request items in the waiting queue file 800 are destined for the device group 605. Then, the works destined for the device group 605 are first dispensed, and if the failure of the device group 605 continues, the engagement amount of the works therefor increases continuously. The distribution of the amounts of engaged works within the whole production system thus becomes uneven, and the operation rates of the respective device groups 605 and 606 become uneven.

SUMMARY OF THE INVENTION

It is therefore an object of this invention to provide a material flow control device for a production system which minimizes the variations of the engaged amounts of works staying in respective production units, and which is immune to disturbing factors such as the device failures, such that the operation rates of the respective device groups within the production system are stabilized.

The above object is accomplished in accordance with the principle of this invention by a material flow control device for controlling flows of works within a production system including a plurality of controlled units each consisting of at least one production device, the production system including at least one controlled unit to which a plurality of work species are transferred from a plurality of controlled units situated upstream of the one controlled unit, the material flow control device which comprises: means for measuring engagement amounts of respective work species staying in respective controlled units; means for setting reference engagement amounts for the respective work species within the respective controlled units; means for calculating evaluation values for the respective work species in the respective controlled units, the evaluation values being based on either a difference or a ratio of the reference engagement amount and the measured engagement amount of the respective work species in the respective controlled units; means for determining order of dispensing the respective work species to the respective controlled units from controlled units situated upstream of the respective controlled units in accordance with the evaluation values for the respective work species in the respective controlled units; and means for issuing dispensing instructions to the controlled units situated upstream of the respective controlled units in accordance with the dispensing order determined by the order determining means.

Alternatively, the material flow control device comprises: means for measuring output amounts per unit time of respective work species from respective controlled units; means for setting reference output amounts per unit time for the respective work species of the respective controlled units; means for calculating evaluation values for the respective work species in the respective controlled units, the evaluation values being based on either a difference or a ratio of the reference output amount and the measured output amount of the respective work species in the respective controlled units; means for determining order of dispensing the respective work species to the respective controlled units from controlled units situated upstream of the respective controlled units in accordance with the evaluation values for the respective work species in the respective controlled units; and means for issuing dispensing instructions to the controlled units situated upstream of the respective controlled units in accordance with the dispensing order determined by the order determining means.

Still alternatively, the material flow control device comprises: means for measuring engagement amounts of respective work species staying in respective controlled units; means for setting reference engagement amounts for the respective work species within the respective controlled units; means for measuring output amounts per unit time of respective work species from respective controlled units; means for setting reference output amounts per unit time for the respective work species of the respective controlled units; means for calculating evaluation values for the respective work species in the respective controlled units, the evaluation values being a function of: a difference or a ratio of the reference engagement amount and the measured engagement amount of the respective work species in the respective controlled units; and a difference or a ratio of the reference output amount and the measured output amount of the respective work species in the respective controlled units; means for determining order of dispensing the respective work species to the respective controlled units from controlled units situated upstream of the respective controlled units in accordance with the evaluation values for the respective work species in the respective controlled units; and means for issuing dispensing instructions to the controlled units situated upstream of the respective controlled units in accordance with the dispensing order determined by the order determining means.

According to still another aspect of this invention, the material flow control device comprises: means for measuring multi-stage engagement amounts of a predetermined width n for respective work species for respective controlled units, the multi-stage engagement amount for a particular one of the controlled units being a sum of engagement amounts of respective work species staying at a series of controlled units of length n headed by the particular one of the controlled units; means for setting reference values for the multi-stage engagement amounts for the respective work species within the respective controlled units; means for calculating evaluation values for the respective work species in the respective controlled units, the evaluation values being based on either a difference or a ratio of the reference values of the multi-stage engagement amount and the measured multi-stage engagement amount of the respective work species for the respective controlled units; means for determining order of dispensing the respective work species to the respective controlled units from controlled units situated upstream of the respective controlled units in accordance with the evaluation values for the respective work species in the respective controlled units; and means for issuing dispensing instructions to the controlled units situated upstream of the respective controlled units in accordance with the dispensing order determined by the order determining means.

According to a further aspect of this invention, a material flow control device comprises: means for measuring multi-stage engagement amounts of a predetermined width n for respective work species for respective controlled units, the multi-stage engagement amount for a particular one of the controlled units being a sum of engagement amounts of respective work species staying at a series of controlled units of length n headed by the particular one of the controlled units; means for setting reference values for the multi-stage engagement amounts for the respective work species within the respective controlled units; means for measuring output amounts per unit time of respective work species from respective controlled units; means for setting reference output amounts per unit time for the respective work species of the respective controlled units; means for calculating evaluation values for the respective work species in the respective controlled units, the evaluation values being a function of: a difference or a ratio of the reference value of the multi-stage engagement amount and the measured multi-stage engagement amount of the respective work species in the respective controlled units; and a difference or a ratio of the reference output amount and the measured output amount of the respective work species in the respective controlled units; means for determining order of dispensing the respective work species to the respective controlled units from controlled units situated upstream of the respective controlled units in accordance with the evaluation values for the respective work species in the respective controlled units; and means for issuing dispensing instructions to the controlled units situated upstream of the respective controlled units in accordance with the dispensing order determined by the order determining means.

BRIEF DESCRIPTION OF THE DRAWINGS

The features which are believed to be characteristic of this invention are set forth with particularity in the appended claims. The structure and method of operation of this invention itself, however, will be best understood from the following detailed description, taken in conjunction with the accompanying drawings, in which:

In the drawings, like reference numerals represent like or corresponding parts or portions.

DETAILED DESCRIPTION OF THE PREFERRED EMBODIMENTS

Referring now to the accompanying drawings, the preferred embodiments of this invention are described.

Figure 1:
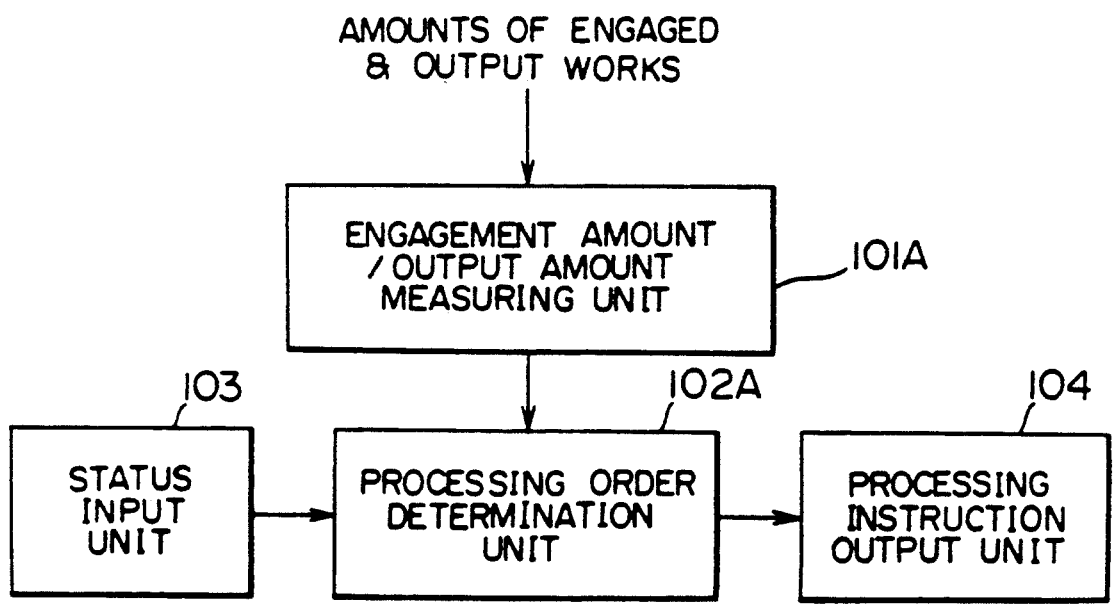
FIG. 1 is a block diagram showing the functional structure of a material flow control device according to an embodiment of this invention.
Figure 8:
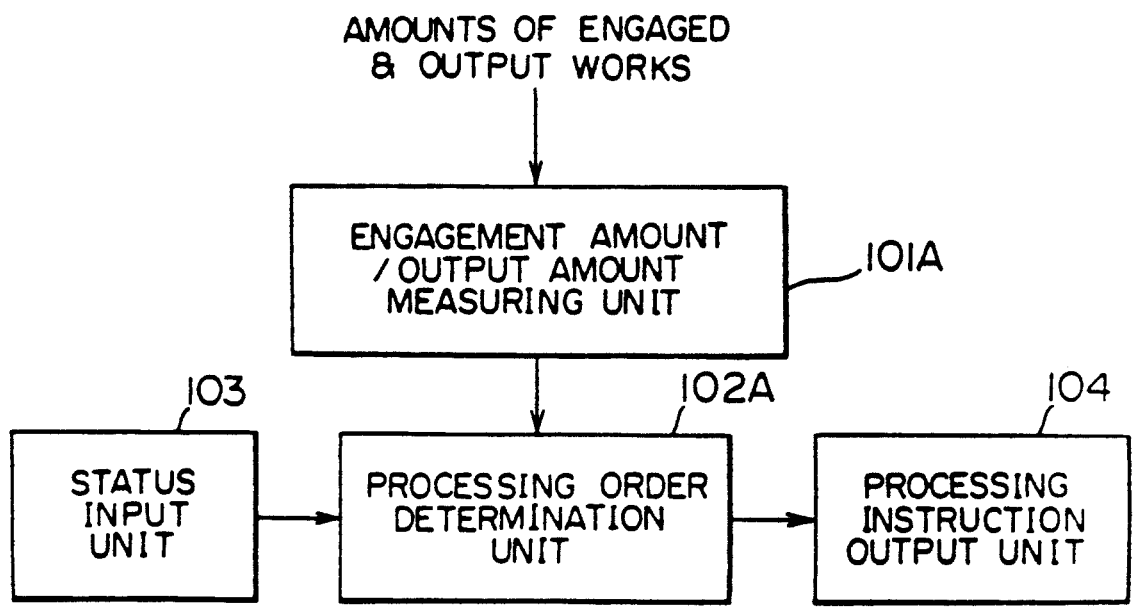
FIG. 8 is a block diagram showing the functional structure of a conventional material flow control device.
Figure 9:
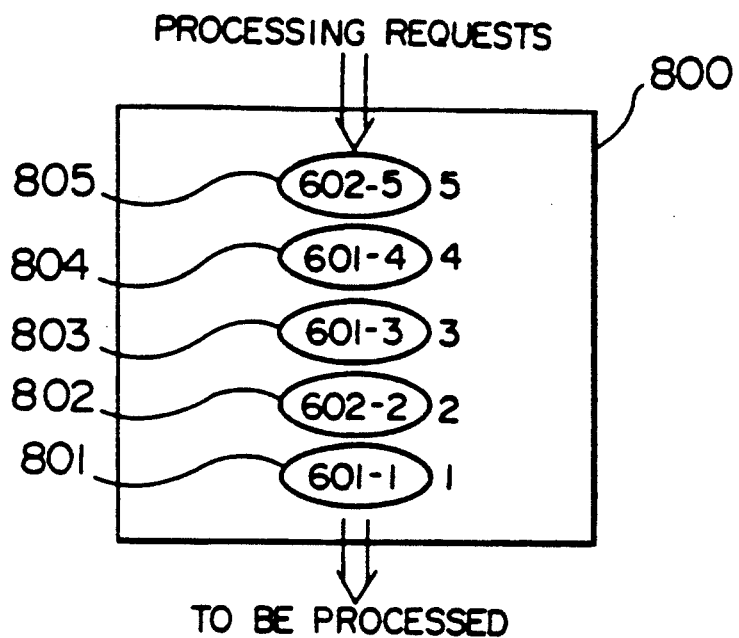
FIG. 9 is a diagram showing a processing wait queue for a production unit 603 within the production system of FIG. 10 controlled by the material flow control device of FIG. 8.
Figure 10:
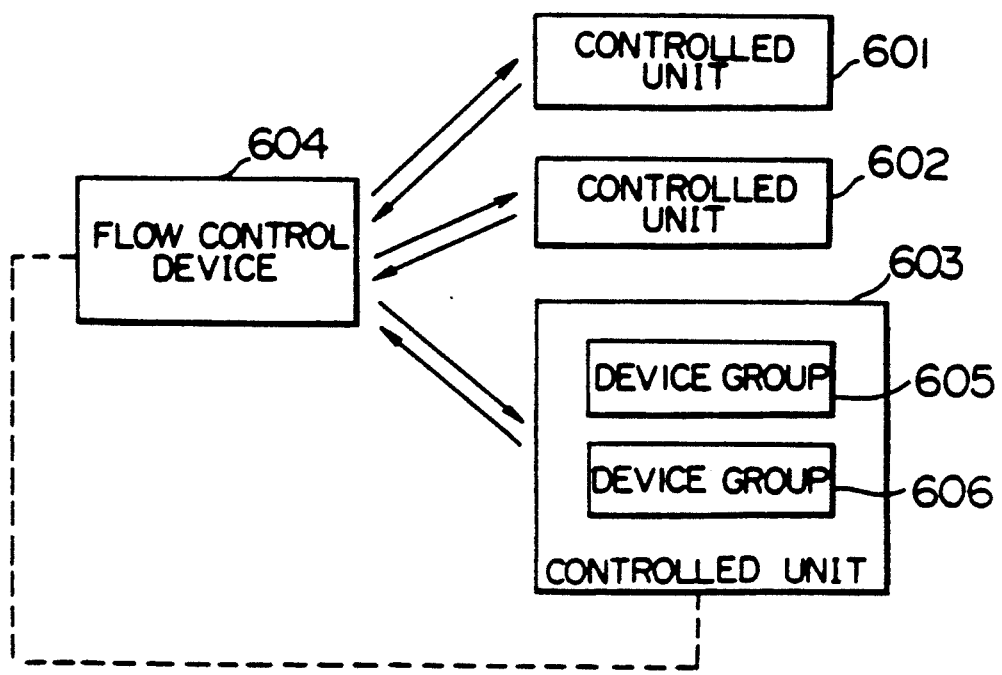
FIG. 10 is a block diagram showing the simplified structural model of the conventional production system.

FIG. 1 is a block diagram showing the functional structure of a material flow control device according to an embodiment of this invention. The material flow control device controls the flow of works in a production system including a plurality of controlled units. The material flow control device includes an engagement amount/output amount measuring unit 101A, processing order determination unit 102A, production system status input unit 103, and processing instruction output unit 104. The engagement amount/output amount measuring unit 101A measures the amounts of engaged and finished works of respective controlled units within the production system. The processing order determination unit 102A generates optimal dispensing instructions on the basis of the states of the device groups constituting the production system. The production system status input unit 103 and the processing instruction output unit 104 are similar to those of FIG. 8 described above. The statuses of the respective controlled units are input to the production system status input unit 103 to trigger the material flow control, and the processing instructions are output to the respective controlled units via the processing instruction output unit 104.

Figure 5:
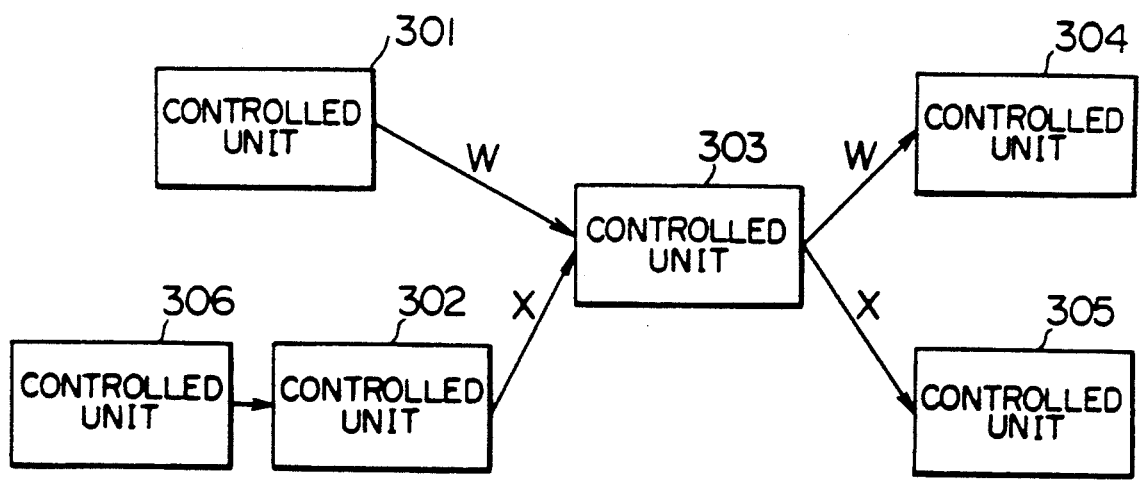
FIG. 5 is a diagram showing the flow of works among the production units within the production system controlled by the material flow control device of FIG. 1.

FIG. 5 is a diagram showing the flow of works among the production units within the production system controlled by the material flow control device of FIG. 1. For simplicity, the number of controlled units 301 through 306 is assumed to be six. Further, it is assumed that there are only two species of produced parts or articles ( referred to as works in this specification), denoted by W and X in the figure. The work species W dispensed from the controlled unit 301 flows via the controlled unit 303 to the controlled unit 304. On the other hand, the work species X dispensed from the controlled unit 306 flows via the controlled unit 302 and the controlled unit 303 to the controlled unit 304.

Figure 6:
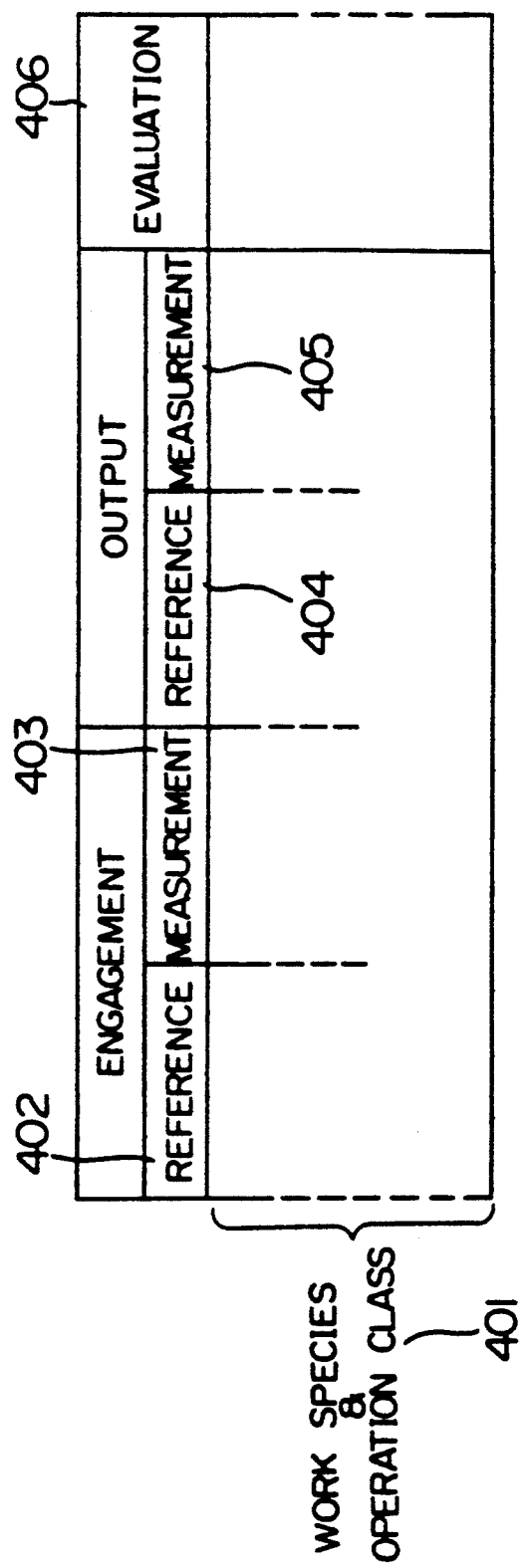
FIG. 6 shows a control reference table maintained within the processing order determination unit 102A of FIG. 1 for each controlled unit of FIG. 5.

FIG. 6 shows a control reference table maintained within the processing order determination unit 102A of FIG. 1 for each controlled unit of FIG. 5. The controlled unit 303, for example, receives work species W and X, and subjects them to several kinds or classes of operations. Each row or line 401 of the control reference table for the controlled unit 303, for example, corresponds to a specific work species W or X and an operation class within the controlled unit 303. Each line 401 of the control reference table includes five values: entries for the reference value 402 and the measurement value 403 for the amount of engaged works; entries for the reference value 404 and the measurement value 405 for the amount of output or finished works; and an entry for a control evaluation value 406.

According to this embodiment, the reference and the measurement engagement amounts 402 and 403 are determined by the multi-stage engagement determination method of width two (the reference and the measurement engagement amounts 402 and 403 are two-stage engagement amounts). Namely, the two-stage measurement engagement amount 403 at a particular controlled unit is the sum of the simple measurement engagement amounts at the particular controlled unit and the subsequent controlled unit. Similarly, the two-stage reference engagement amount 402 at a particular controlled unit is the sum of the simple reference engagement amounts at the particular controlled unit and the subsequent controlled unit. For example, the two-stage measurement engagement amounts 403 for the work species W at the controlled unit 303 is calculated as the sum of the simple measurement engagement amounts at the controlled unit 303 and the subsequent controlled units 304. Similarly, the two-stage reference engagement amounts 402 for the work species W at the controlled unit 303 is calculated as the sum of the simple reference engagement amounts at the controlled unit 303 and the subsequent controlled units 304.

On the other hand, the reference and the measurement values of the output 404 and 405 represent the reference and the measurement values, respectively, of the amounts of finished works per unit time at respective controlled units 301 and 306. The amounts of finished works may be determined at an arbitrary location, such as the exit of works, within the respective controlled units 301 through 306, provided that the location is the same for all the controlled units.

The engagement and the output reference values 402 and 403 for respective lines of the control reference table corresponding to respective work species and operation classes within respective controlled unit are determined beforehand on the basis of the past measurements, etc. On the other hand, the evaluation value 406 for respective lines is determined as a function of two differences: the difference between the measurement and the reference engagement amounts 403 and 402; and the difference between the measurement and the reference outputs 405 and 404. Alternatively, the evaluation value 406 for respective lines may be determined as a function of two ratios: the ratio of the measurement and the reference engagement amounts 403 and 402; and the ratio of the measurement and the reference outputs 405 and 404. The function may be a simple sum of the two values, such that the evaluation value 406 is the sum of the two differences or ratios.

Figure 7:
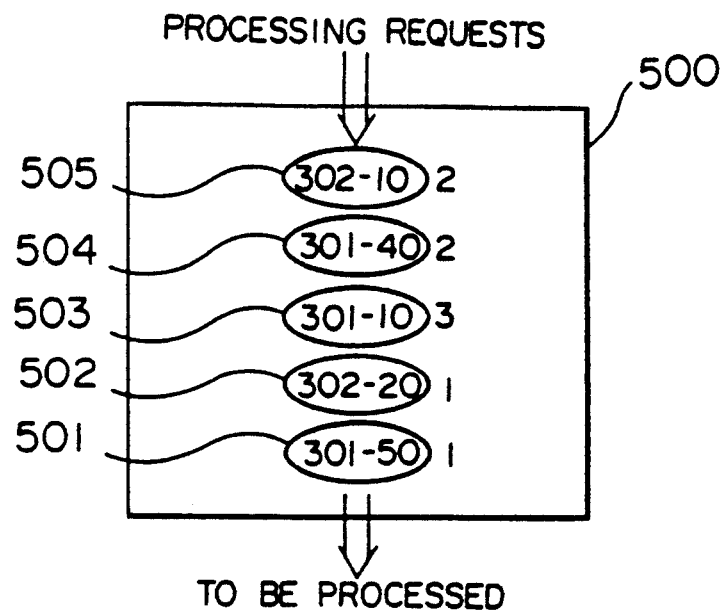
FIG. 7 is a diagram showing a processing wait queue file for a production unit 303 of FIG. 5 controlled by the material flow control device of FIG. 1.

FIG. 7 is a diagram showing a processing wait queue file for a production unit 303 of FIG. 5 controlled by the material flow control device of FIG. 1. The wait queue files are maintained within the 102A for respective controlled units 301 through 306. The waiting queue file 500 includes a plurality of processing wait request items 501 through 505, stacked from bottom to top in the order of generation of the requests. Thus, the oldest request 501 is at the bottom and the most recent request 505 is at the top. The leading part of the encircled number of each request item represents the source of the request. For example, the request items with the leading number 301 originate from the controlled unit 301 for the work species W. The request items with the leading number 302 originate from the controlled unit 302 for the work species X. The numbers after the hyphen represent respective evaluation values 406 for the respective items. Greater evaluation values signify greater priority. The numbers at the right of respective items represent respective order of processing of the respective works W and X. As described below, each request item may include information upon the operation class which is to be performed for the works within the controlled unit.

According to this embodiment, three queue files similar to that shown in FIG. 7 are maintained for each one of the controlled units 301 through 306: a waiting queue file 1 resulting from a capacity checking step; a waiting queue file 2 resulting from an engagement amount checking step; and a waiting queue file 3 resulting from an output amount checking step. The steps for accumulating requests in respective files are described in detail below.

Next, the operation of the material flow control device of FIG. 1 is described. According to this embodiment, the material flow control operation is triggered at three distinct occasions: (1) when a controlled unit is ready for dispensing works; (2) when works are actually dispensed from a controlled unit; and (3) when the output reference values 404 for a controlled unit are updated. The material flow control procedure for the respective cases (1), (2) and (3) are described by reference to FIGS. 2, 3 and 4, respectively, in relation to the flow of works to and from the controlled unit 303.

Figure 2:
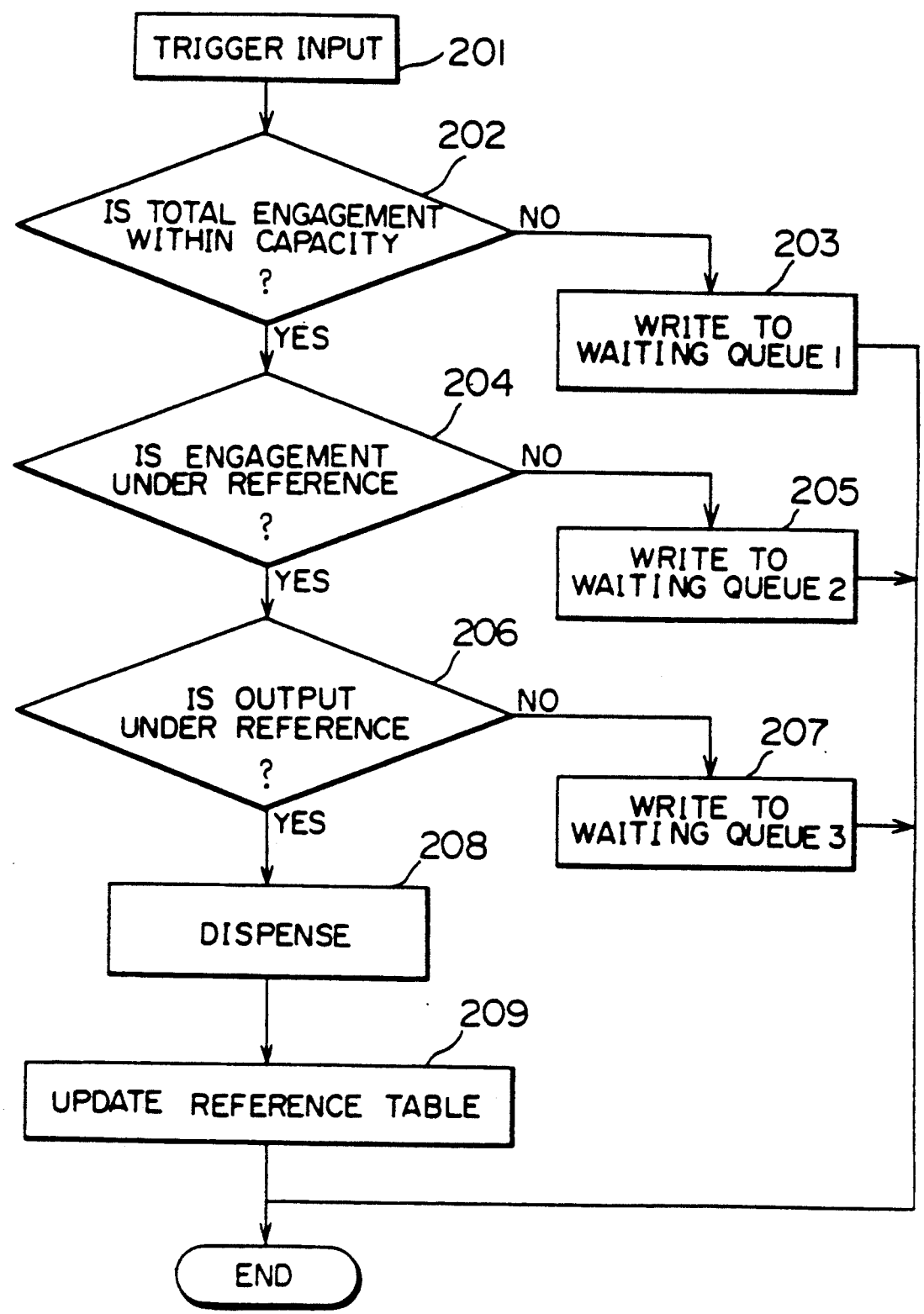
FIG. 2 is a flowchart showing the material flow control procedure which is triggered when a controlled unit is ready for dispensing works.

FIG. 2 is a flowchart showing the material flow control procedure which is triggered when a controlled unit is ready for dispensing works. In what follows, the description is made of the procedure which is triggered when the controlled unit 302 is ready for dispensing work species X to the controlled unit 303.

First at step S201, when the controlled unit 302 is ready for dispensing work species X to the controlled unit 303, the ready status of the controlled unit 302 is input to the production system status input unit 103, such that the procedure of FIG. 2 is triggered.

At step S202, it is judged whether or not the current engagement amount of work species X at the controlled unit 303 is within the physical engagement capacity thereof for the work species X. If the judgment is negative, the execution proceeds to step S203, where the request item for the work species X and the operation class therefor within the controlled unit 303 are accumulated on top of the processing wait queue file 1, together with the evaluation value 406 therefor.

If, on the other hand, the judgment is affirmative at step S202, the execution proceeds to step S204, where it is judged whether or not the measurement engagement amount 403 of work species X at the controlled unit 303 is under the reference engagement amount 402. If the judgment is negative, the execution proceeds to step S205, where the request item for the work species X and the operation class therefor within the controlled unit 303 are accumulated on top of the processing wait queue file 2, together with the evaluation value 406 therefor.

If, on the other hand, the judgment is affirmative at step S204, the execution proceeds to step S206, where it is judged whether or not the measurement output amount 405 of work species X at the controlled unit 303 is under the reference output amount 405. If the judgment is negative, the execution proceeds to step S207, where the request item for the work species X and the operation class therefor within the controlled unit 303 are accumulated on top of the processing wait queue file 3, together with the evaluation value 406 therefor.

If, on the other hand, the judgment is affirmative at step S206, the execution proceeds to step S208, where the work species X is dispensed from the controlled unit 302 to the controlled unit 303.

Further, at step S209, control reference tables for the controlled units 302, 303, and 306 are updated. Namely, the control reference table for the controlled unit 303 is updated with respect to the line corresponding to the work species X and the operation class for the dispensed works within the controlled unit 303, such that the amount corresponding to the dispensation of the work species X from the controlled unit 302 to the controlled unit 303 is added to the entry for engagement measurement amount 403. Further, the evaluation value 406 for the same line is updated in accordance with the evaluation method as described above.

Further, the control reference table for the controlled unit 302 is updated with respect to the line corresponding to the work species X and the operation class for the dispensed works within the controlled unit 302, such that the amount corresponding to the dispensation of the work species X from the controlled unit 302 to the controlled unit 303 is added to the entry for output measurement amount 405. Further, the evaluation value 406 for the same line is updated in accordance with the evaluation method as described above.

Furthermore, since the width of the multi-stage engagement is two, the control reference table of the controlled unit 306, which is positioned upstream of the controlled unit 302 in the material flow control network, is updated with respect to the line corresponding to the work species X and the operation class for the dispensed work species within the controlled unit 306, such that the amount corresponding to the dispensation of the work species X from the controlled unit 302 to the controlled unit 303 is subtracted from the entry for engagement measurement amount 403. Further, the evaluation value 406 for the same line is updated.

When the controlled units other than the controlled unit 302 is ready for dispensing works the material flow control procedure similar to that described above is triggered, and either the request items are accumulated in respective processing wait queue files or the works are dispensed and the control reference tables of the controlled units involved in the flow of works are updated.

Figure 3:
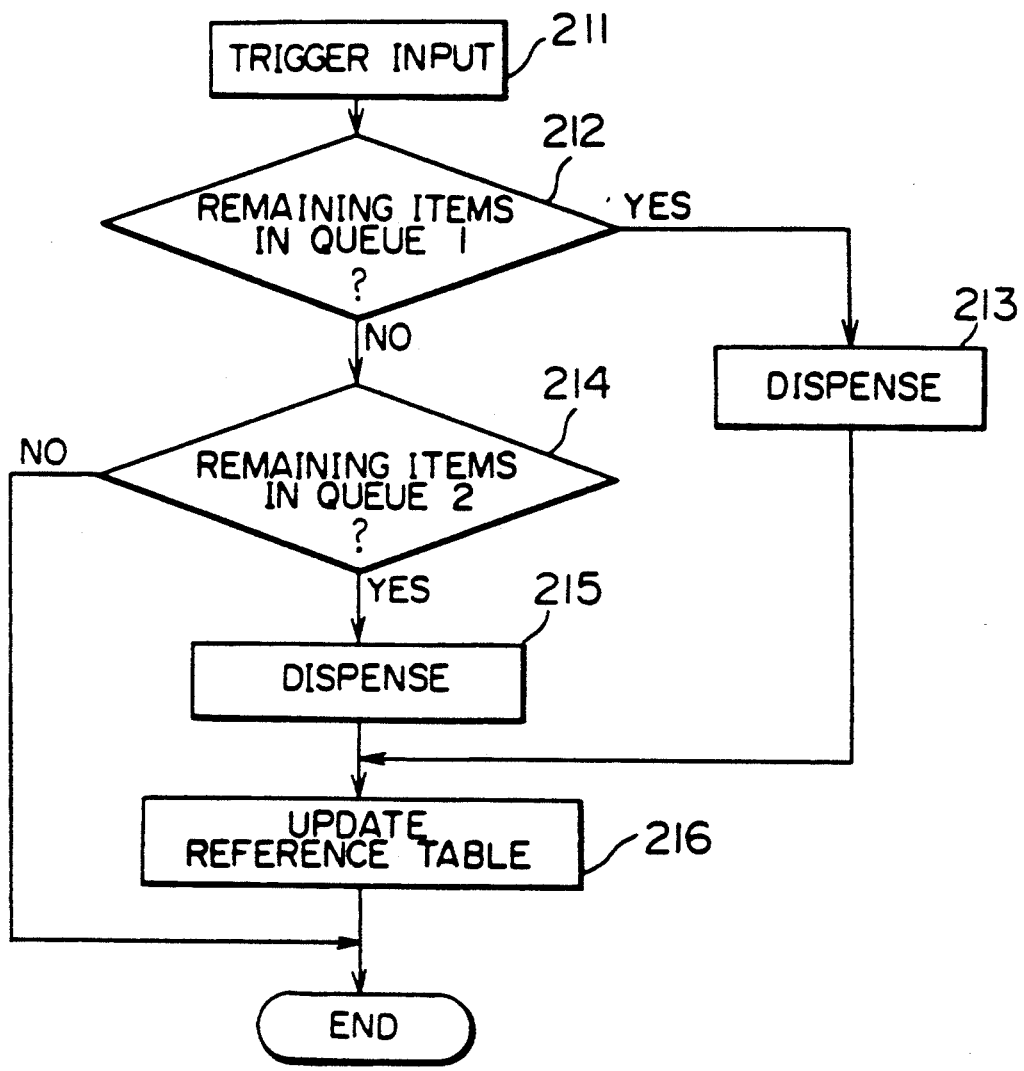
FIG. 3 is a flowchart showing the material flow control procedure which is triggered when the works are actually dispensed from a controlled unit.

FIG. 3 is a flowchart showing the material flow control procedure which is triggered when the works are actually dispensed from a controlled unit. In what follows, description is made of the case where the work species X is dispensed from the controlled unit 303 to the controlled unit 305.

Figure 4:
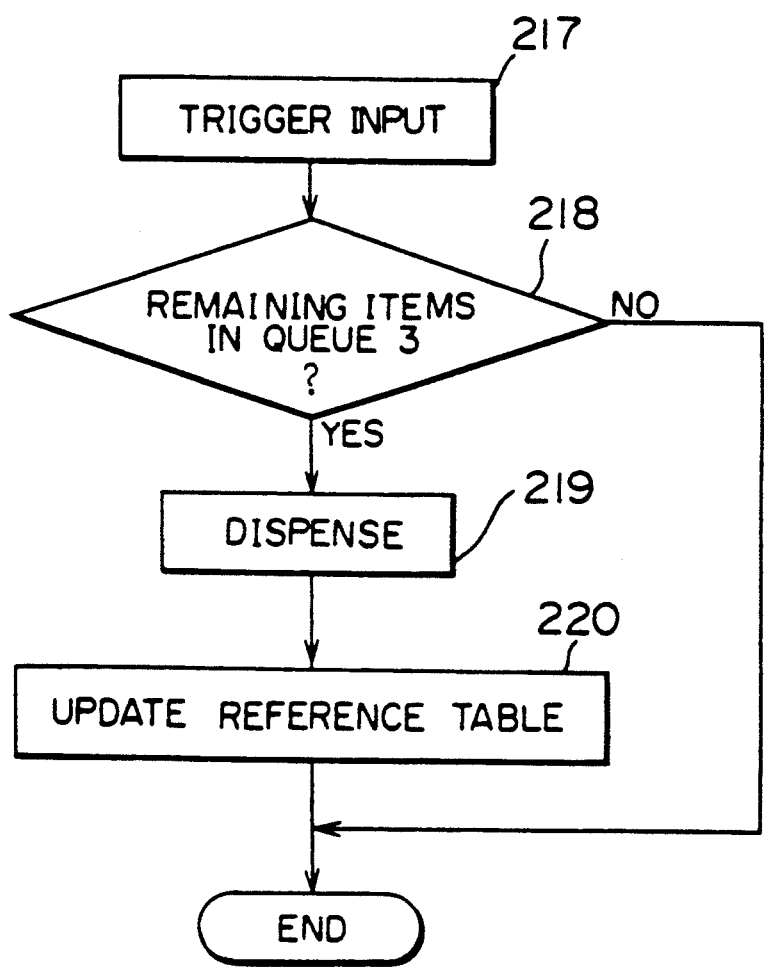
FIG. 4 is a flowchart showing the material flow control procedure which is triggered when the output reference values for a controlled unit are updated.

At step S211, when the controlled unit 303 has dispensed the work species X to the controlled unit 305, a signal indicating the completion of the dispensation of the work species X from the controlled unit 303 is input to the production system status input unit 103 to trigger the procedure of FIG. 4.

At step S212, it is judged whether or not request items are present within the processing wait queue file 1 (in the case described, the file for the controlled unit 303 whose entries are accumulated at step S203 of FIG. 2). If the judgment is affirmative at step S212, the execution proceeds to step S213, where the works involved in the request items of greater priority within the processing wait queue file 1 are dispensed to the controlled unit 303 from the controlled units which are identified as the sources of the requests. Namely, the dispensing instructions are output from the processing order determination unit 102 to the source controlled units via the processing instruction output unit 104 and the works involved in the requests are dispensed from the controlled units specified as sources in the requests. The dispensing instructions are generated in the order of greater control evaluation values 406 for the respective request items in the processing wait queue file 1, and the total amount of dispensation is determined in accordance with the margin for the physical engagement, capacity and the engagement and the output reference values for the work species X and the operation class therefor as specified in the control reference table of the controlled unit 303. After the step S213, the execution proceeds to step S216.

On the other hand, if the judgment is negative at step S212, the execution proceeds to step S214, where it is judged whether or not request items for the work species X and the operation class therefor within the controlled unit 303 are present within the processing wait queue file 2 (in the case described, the file for the controlled unit 303 whose entries are accumulated at step S205 of FIG. 2). If the judgment is affirmative at step S214, the execution proceeds to step S215, where the works involved in the request items are dispensed to the controlled unit 303 from the controlled unit 302. The total amount of dispensation is determined in accordance with the margin for the physical engagement capacity and the engagement and the output reference values for the work species X and the operation class therefor as specified in the control reference table of the controlled unit 303. After the step S215, the execution proceeds to step S216.

At step S216, the control reference tables of the controlled units involved in the material flow occasioned at dispensation steps S213 and S215 are updated. Namely, the control reference table of the controlled unit 303 is updated with respect to the line(s) 401 corresponding to the work species dispensed at step S213 or step S215 and the operation class(es) therefor within the controlled unit 303, such that the amount corresponding to the dispensation of works from the upstream controlled units to the controlled unit 303 is added to the engagement measurement amount 403.

Further, the control reference table of controlled unit 302 from which the work species X is dispensed to the controlled unit 303 at step S213 or step S215 is updated with respect to the line 401 corresponding to the work species X and the operation class therefor within the controlled unit 302, such that the amount corresponding to the dispensation is added to the output measurement amount 405.

Furthermore, since the multi-stage engagement width is two according to this embodiment, the control reference table of the controlled unit. 306 which is positioned upstream of the controlled unit 302 is updated with respect to the line 401 corresponding to the work species X and the operation class therefor within the controlled unit 306, such that the amount corresponding to the dispensation of the work species X from the controlled unit 302 to the controlled unit 303 is subtracted from the entry for engagement measurement amount 403.

The evaluation values 406 for the respective updated lines in the control reference tables of the controlled units 303,302, and 306 are also updated on the basis of the new measurement and reference values of the engagement and the output amounts in accordance with the evaluation method as described above. Thereafter, the procedure of FIG. 3 is terminated.

FIG. 4 is a flowchart showing the material flow control procedure which is triggered when the output reference values for a controlled unit are updated. In what follows, description is made of the case where the output reference value 404 for the work species X within the control reference table of the controlled unit 303 is updated.

At step S217, the material flow control procedure of FIG. 4 is triggered upon updating the output reference value 404 in the control reference table of controlled unit 303.

At step S218, it is judged whether or not request items for the work species X whose output reference value has been updated are present in the processing wait queue file 3 whose requests are accumulated at step S207 in FIG. 2. If the judgment is negative, the procedure is terminated.

On the other hand, if the judgment is affirmative at step S218, the execution proceeds to step S219, where the work species X is dispensed from the controlled unit 302 to the controlled unit 303. The total amount of dispensation is determined in accordance with the margin for the physical engagement capacity and the engagement and the output reference values for the work species X and the operation class therefor as specified in the control reference table of the controlled unit 303.

Thereafter at step S220, the control reference tables of the controlled units involved in the material flow occasioned by the dispensation at step S219 are updated. Namely, the control reference table of the controlled unit 303 is updated with respect to the line 401 corresponding to the work species X and operation class therefor within the controlled unit 303, such that the amount corresponding to the dispensation from the controlled unit 302 to the controlled unit 303 is added to the engagement measurement amount 403. Further, the control reference table of controlled unit 302 from which the work species X is dispensed to the controlled unit 303 is updated with respect to the line 401 corresponding to the work species X and the operation class therefor within the controlled unit 302, such that the amount corresponding to the dispensation is added to the output measurement amount 405. Furthermore, since the multi-stage engagement width is two according to this embodiment, the control reference table of the controlled unit 306 which is positioned upstream of the controlled unit 302 is updated with respect to the line corresponding to the work species X and the operation class therefor within the controlled unit 306, such that the amount corresponding to the dispensation of the work species X from the controlled unit 302 to the controlled unit 303 is subtracted from the entry for engagement measurement amount 403.

The evaluation values 406 for the respective updated lines in the control reference tables of the controlled units 303, 302, and 306 are also updated on the basis of the new measurement and reference values of the engagement and the output amounts in accordance with the evaluation method as described above. Thereafter, the procedure of FIG. 4 is terminated.

In the case of the above embodiment, the width of the multi-stage engagement is two, such that the measurement and reference engagement amounts 402 and 403 are two-stage engagement values. However, the width of the multi-stage engagement may be greater than two or equal to one, depending on the characteristics of the production system or the desired processing speed.

Further, in the case of the above embodiment, the amount of output is checked at step S206 after the amount of engagement is checked at step S204. However, the order of these two steps may be reversed, or either of the two steps may be dispensed with, depending on the characteristics of the production system or the desired processing speed. Furthermore, the engagement amount/output amount measuring unit 101A, which is located within the material flow control device in the case of the above embodiment, may be disposed outside thereof. In addition, although in the case of the above embodiment, each controlled unit consists of a group of production devices, it may consist of a single production device.

What is claimed is:

1. A material flow control device for controlling flows of works within a production system including a plurality of controlled units each consisting of at least one production device, said production system including at least one controlled unit to which a plurality of work species are transferred from a plurality of controlled units situated upstream of said one controlled unit, said material flow control device comprising:

means for measuring engagement amounts of respective work species staying in respective controlled units;

means for setting reference engagement amounts for said respective work species within said respective controlled units;

means for calculating evaluation values for said respective work species in said respective controlled units, said evaluation values being based on either a difference or a ratio of said reference engagement amount and said measured engagement amount of said respective work species in said respective controlled units;

means for determining order of dispensing said respective work species to said respective controlled units from controlled units situated upstream of said respective controlled units in accordance with said evaluation values for said respective work species in said respective controlled units; and means for issuing dispensing instructions to said controlled units situated upstream of said respective controlled units in accordance with said dispensing order determined by said order determining means.

2. A material flow control device for controlling flows of works within a production system including a plurality of controlled units each consisting of at least one production device, said production system including at least one controlled unit to which a plurality of work species are transferred from a plurality of controlled units situated upstream of said one controlled unit, said material flow control device comprising:

means for measuring output amounts per unit time of respective work species from respective controlled units;

means for setting reference output amounts per unit time for said respective work species of said respective controlled units;

means for calculating evaluation values for said respective work species in said respective controlled units, said evaluation values being based on either a difference or a ratio of said reference output amount and said measured output amount of said respective work species in said respective controlled units;

means for determining order of dispensing said respective work species to said respective controlled units from controlled units situated upstream of said respective controlled units in accordance with said evaluation values for said respective work species in said respective controlled units; and means for issuing dispensing instructions to said controlled units situated upstream of said respective controlled units in accordance with said dispensing order determined by said order determining means.

3. A material flow control device for controlling flows of works within a production system including a plurality of controlled units each consisting of at least one production device, said production system including at least one controlled unit to which a plurality of work species are transferred from a plurality of controlled units situated upstream of said one controlled unit, said material flow control device comprising:

means for measuring engagement amounts of respective work species staying in respective controlled units;

means for setting reference engagement amounts for said respective work species within said respective controlled units;

means for measuring output amounts per unit time of respective work species from respective controlled units;

means for setting reference output amounts per unit time for said respective work species of said respective controlled units;

means for calculating evaluation values for said respective work species in said respective controlled units, said evaluation values being a function of: a difference or a ratio of said reference engagement amount and said measured engagement amount of said respective work species in said respective controlled units; and a difference or a ratio of said reference output amount and said measured output amount of said respective work species in said respective controlled units;

means for determining order of dispensing said respective work species to said respective controlled units from controlled units situated upstream of said respective controlled units in accordance with said evaluation values for said respective work species in said respective controlled units; and means for issuing dispensing instructions to said controlled units situated upstream of said respective controlled units in accordance with said dispensing order determined by said order determining means.

4. A material flow control device for controlling flows of works within a production system including a plurality of controlled units each consisting of at least one production device, said production system including at least three controlled units connected in series with respect to a flow of work species and one controlled unit to which a plurality of work species are transferred from a plurality of controlled units situated upstream of said one controlled unit, said material flow control device comprising:

means for measuring multi-stage engagement amounts of a predetermined width n for respective work species for respective controlled units, said multi-stage engagement amount for a particular one of said controlled units being a sum of engagement amounts of respective work species staying at a series of controlled units of length n headed by said particular one of said controlled units;

means for setting reference values for said multi-stage engagement amounts for said respective work species within said respective controlled units;

means for calculating evaluation values for said respective work species in said respective controlled units, said evaluation values being based on either a difference or a ratio of said reference values of said multi-stage engagement amount and said measured multi-stage engagement amount of said respective work species for said respective controlled units;

means for determining order of dispensing said respective work species to said respective controlled units from controlled units situated upstream of said respective controlled units in accordance with said evaluation values for said respective work species in said respective controlled units; and means for issuing dispensing instructions to said controlled units situated upstream of said respective controlled units in accordance with said dispensing order determined by said order determining means.

5. A material flow control device for controlling flows of works within a production system including a plurality of controlled units each consisting of at least one production device, said production system including at least three controlled units connected in series with respect to a flow of work species and one controlled unit to which a plurality of work species are transferred from a plurality of controlled units situated upstream of said one controlled unit, said material flow control device comprising:

means for measuring multi-stage engagement amounts of a predetermined width n for respective work species for respective controlled units, said multi-stage engagement amount for a particular one of said controlled units being a sum of engagement amounts of respective work species staying at a series of controlled units of length n headed by said particular one of said controlled units;

means for setting reference values for said multi-stage engagement amounts for said respective work species within said respective controlled units;

means for measuring output amounts per unit time of respective work species from respective controlled units;

means for setting reference output amounts per unit time for said respective work species of said respective controlled units;

means for calculating evaluation values for said respective work species in said respective controlled units, said evaluation values being a function of: a difference or a ratio of said reference value of said multi-stage engagement amount and said measured multi-stage engagement amount of said respective work species in said respective controlled units; and a difference or a ratio of said reference output amount and said measured output amount of said respective work species in said respective controlled units;

means for determining order of dispensing said respective work species to said respective controlled units from controlled units situated upstream of said respective controlled units in accordance with said evaluation values for said respective work species in said respective controlled units; and means for issuing dispensing instructions to said controlled units situated upstream of said respective controlled units in accordance with said dispensing order determined by said order determining means.

* * * * *